United States Patent [19]

Platz et al.

[11] 4,071,325

[45] Jan. 31, 1978

[54] ETHYLENE POLYMERIZATION REACTOR

[75] Inventors: Gerald M. Platz, West Chester, Ohio; Norris W. Walkup, Atwood, Ill.

[73] Assignee: National Distillers and Chemical Corporation, New York, N.Y.

[21] Appl. No.: 714,451

[22] Filed: Aug. 16, 1976

[51] Int. Cl.[2] ............................ B01J 3/04; C08F 2/00
[52] U.S. Cl. ...................................... 23/290; 23/285; 23/289; 23/252 R; 23/284; 526/64; 526/65; 526/66; 526/88
[58] Field of Search ................. 23/290, 285, 289, 252, 23/284; 526/64, 65, 66, 67, 88

[56] References Cited

U.S. PATENT DOCUMENTS

| | | | |
|---|---|---|---|
| 2,627,171 | 2/1953 | Brumagim | 23/290 X |
| 2,739,879 | 3/1956 | Bates et al. | 23/285 |
| 2,806,364 | 9/1957 | Wilson | 23/290 X |
| 3,252,766 | 5/1966 | Chadbourne et al. | 23/285 X |
| 3,692,763 | 9/1972 | Van Saane et al. | 23/289 X |
| 3,756,996 | 9/1973 | Pugh et al. | 526/65 |
| 3,759,811 | 9/1973 | Platz et al. | 23/285 X |

Primary Examiner—James H. Tayman, Jr.
Attorney, Agent, or Firm—Kenneth D. Tremain

[57] ABSTRACT

A reactor including a horizontally disposed, elongated motor housing and at least a pair of mating reactor body sections, end heads for sealing the outer ends of the reactor and closure straps removably and hermetically securing the motor housing and the respective reactor body sections in assembled relation, and fixed and movable cradles supporting the motor housing and the reactor body sections for effecting relative movement thereof upon disengagement of the reactor clamping structure to permit ready disassembly and maintenance of the reactor.

5 Claims, 11 Drawing Figures

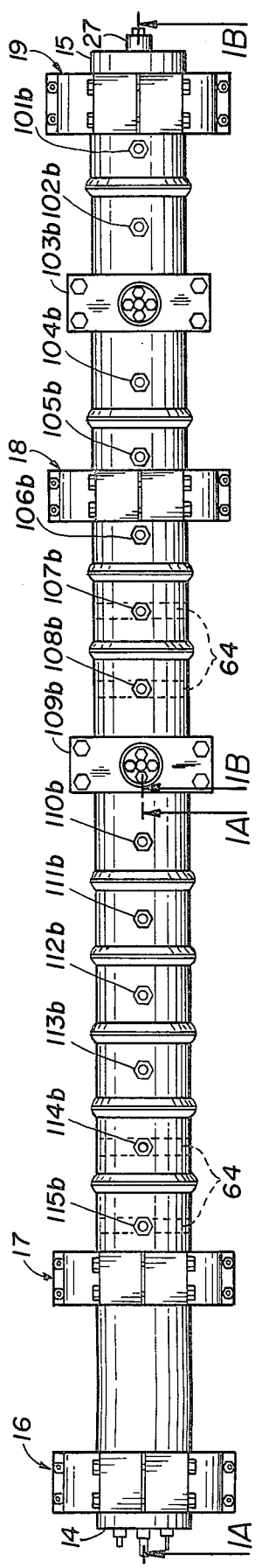
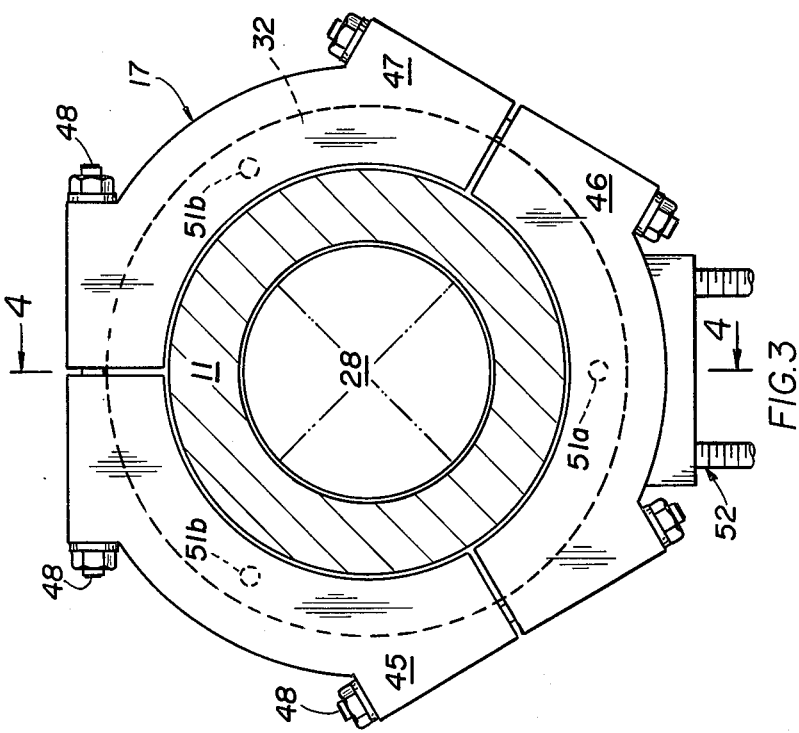
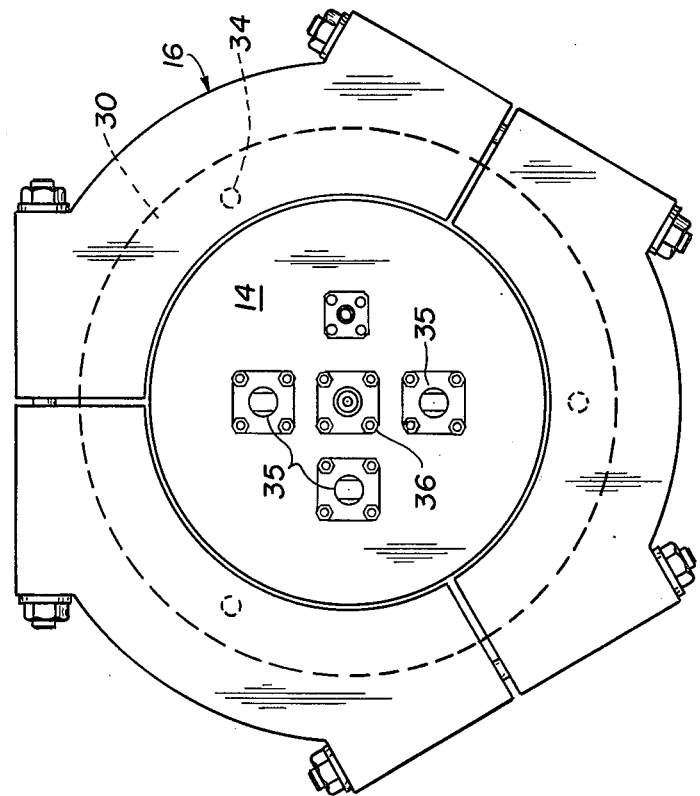

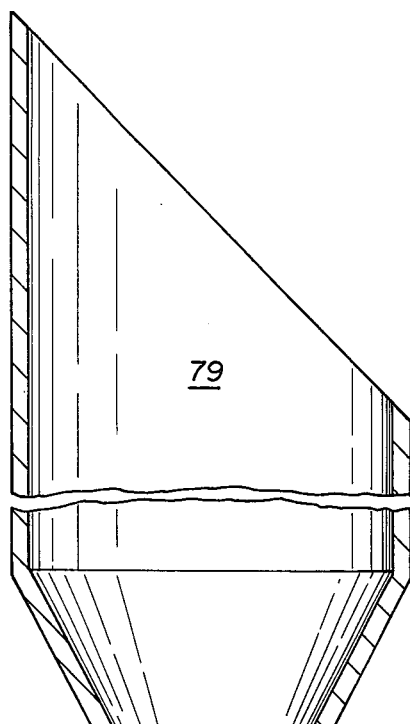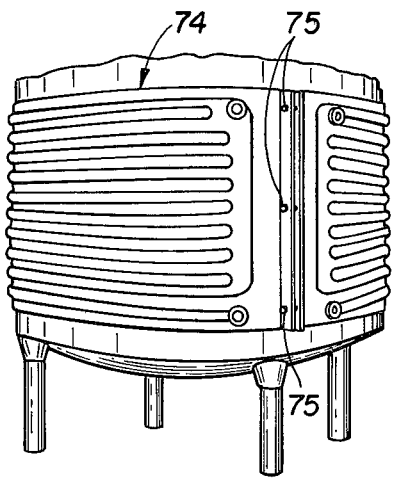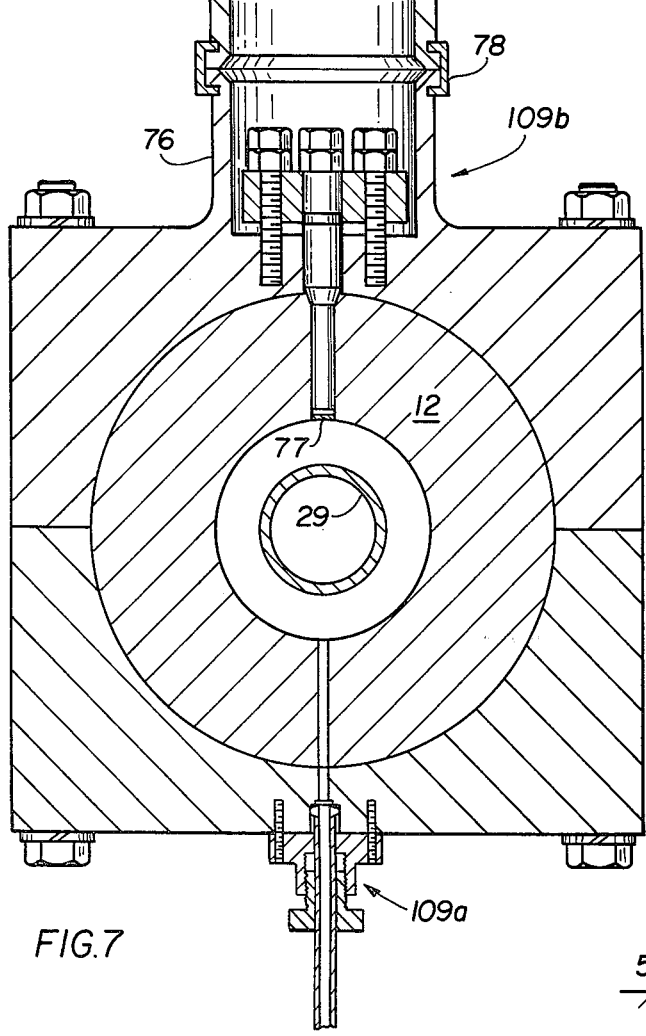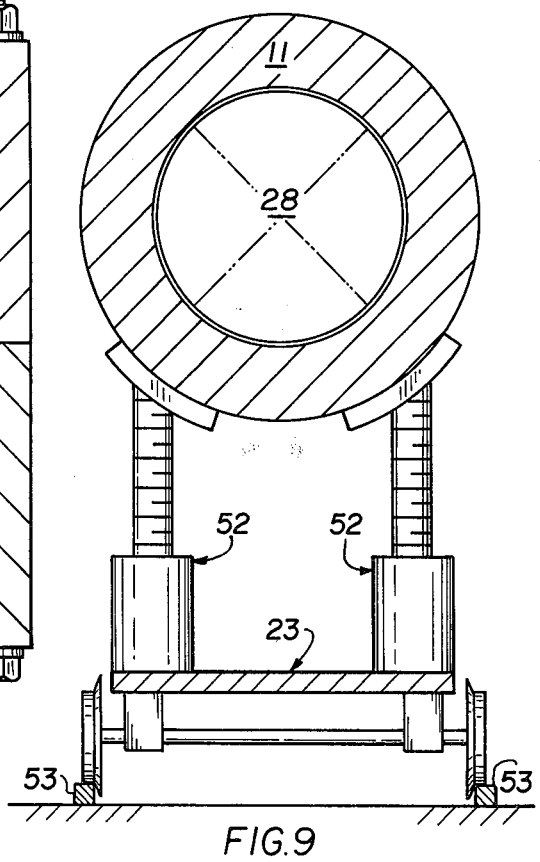
FIG.7
FIG.8
FIG.9

ETHYLENE POLYMERIZATION REACTOR

BACKGROUND OF THE INVENTION

It is well known to produce polyethylene by polymerization under high pressures within stirred autoclave-type reactors. Apparatus of this type has been described in the patent literature over the past 30 years or more, for example, as early as Krase et al U.S. Pat. No. 2,396,791 granted to du Pont on Mar. 19, 1946, and, more recently, in Pugh et al U.S. Pat. No. 3,756,996, granted to National Distillers & Chemical Corporation on Sept. 4, 1973.

Stirred autoclaves of the type referred to in the aforesaid Pugh et al patent, for example, have been designed with successively larger reactor volumes as greater production capacities have become desirable. Typically, reactors of this type having lengths of up to about 20 feet, L/D (Length/diameter) ratios of the order of 15 or more, and reaction volumes of up to about 30 cubic feet, have been utilized in the production of low density polyethylene resins. The use of such large volume reactors has, however, posed numerous problems, particularly with respect to increased investment costs, the difficulty and cost of maintenance, susceptibility to fire damage, and the like.

SUMMARY OF THE INVENTION

It is among the objects of the present invention to provide an improved stirred autoclave-type reactor useful in the polymerization of ethylene at high pressures, which possesses a substantially greater L/D ratio and reaction volume, and yet which exhibits markedly improved structural integrity, operational and safety characteristics, and which may be built, operated and maintained at substantially lower cost and improved safety than devices heretofore designed for that purpose.

Other objects and advantages of the invention will be apparent from the following description thereof.

The polymerization reactor provided in accordance herewith comprises an elongated reactor vessel incorporating a stirrer motor housing, a first reactor body section contiguous to and in communication therewith, and a second reactor body section communicating with the first such section. The motor housing is provided as a separate section so that if a stirrer motor of different diminsions is required, the change can be economically made by providing a new motor housing instead of having to replace the housing and the reactor body as one piece. The reactor body has been divided into two sections to overcome the difficulty and cost involved in obtaining a single forged billet of such large dimensions. Extending longitudinally from the motor housing through the first and second reactor body sections is a suitable stirrer for agitating the reaction mixture passed therethrough. The respective sections are maintained in assembled relation by end heads sealing the opposite ends of the motor housing and the second reactor body section, and closure straps removably and hermetically securing the motor housing and the respective reactor body sections. The composite reactor assembly thus provided is horizontally supported by fixed and movable cradle means, the former including means for deflecting longitudinally of the reactor to accommodate the thermal expansion thereof, and the latter facilitating movement of the motor housing and the reactor body sections relative to one another upon disengagement of the closure straps to permit ready disassembly and maintenance of the reactor.

There is thus provided a reactor structure which may possess substantially greater L/D ratios and reaction volumes than currently available stirred autoclave reactors. Greater L/D ratios permit a more precise control of the reaction temperatures over the length of the reactor. Greater reaction volumes allow higher productivity contributing to lower product costs. Longer residence times improve both the polymer product properties and the raw material utilization. Indeed, the horizontal sectioned reactor assembly hereof may be provided with any desired number of "add-on" reactor body sections to meet desired production capacities. The apparatus hereof may thus possess an L/D ratio of, for example, from 20 up to 40 or more, and a reaction volume of, for example, from 40 cubic feet up to as much as 100 cubic feet or more.

The horizontal reactor assembly requires reduced capital investment in view of the simplification of necessary structural bracing, piping configurations and the like. Compared to the usual vertical mounting, the horizontal disposition of the reactor allows for a simpler and less costly protective reactor bay or revetment while enhancing the overall safety aspects by the natural drainage and dilution of potentially explosive gas mixtures by convection and atmospheric winds. Moreover, provision of the specified closure straps for the respective reactor sections in combination with the fixed and movable support means therefor permits simplified and more economical maintenance of the reactor. Thus, for example, servicing or replacement of motor or stirrer parts may be effected without the necessity for disassembly of the entire reactor.

The reactor assembly hereof additionally minimizes the hazards of ethylene explosion and fire. For example, in accordance with one feature of the invention, thermocouple side entries are spaced longitudinally of and along the lower side of the reactor, whereas monomer and catalyst feed entries are spaced along the upper side thereof. In this manner, the sensitive thermocouples are not susceptible to damage in the event of a possible fire. In accordance with yet a further feature, the product stream pressure let-down valve is provided integral with the end head on the second reactor body section, thereby avoiding the possibility of blown joints and fires as may occur due to thermal contraction of piping when the let-down valve is disposed a distance downstream from the reactor.

These and other objects and advantages achieved by the polymerization reactor of the present invention will be more fully apparent from consideration of the following drawings, illustrating a preferred embodiment of the apparatus hereof.

BRIEF DESCRIPTION OF THE DRAWINGS

In the drawings, in which a preferred embodiment of the reactor assembly of the invention is illustrated, partially schematically and on varying scales:

FIG. 1 is a plan view of the horizontally disposed, elongated reactor assembly;

FIG. 2 is an end elevation of one of the reactor head assemblies, viewed in the direction of 2—2 in FIG. 1A;

FIG. 3 is a vertical section through the motor housing showing the closure straps between the stirrer motor housing and the first reactor body section, viewed in the direction of 3—3 in FIG. 1A;

FIG. 7 is a vertical section through one of the two emergency vent stack adapter and thermocouple side entry assemblies viewed in the direction of 7—7 in FIG. 1B;

FIG. 8 is a perspective view of plate coil jacketing which may be utilized in place of the steam jacketing shown in the reactor embodiment of FIGS. 1-7; and FIG. 9 is a vertical section through the rolling cradle supporting the motor housing viewed in the direction of 9—9 in FIG. 1A.

THE PREFERRED EMBODIMENT

Figure 1A:
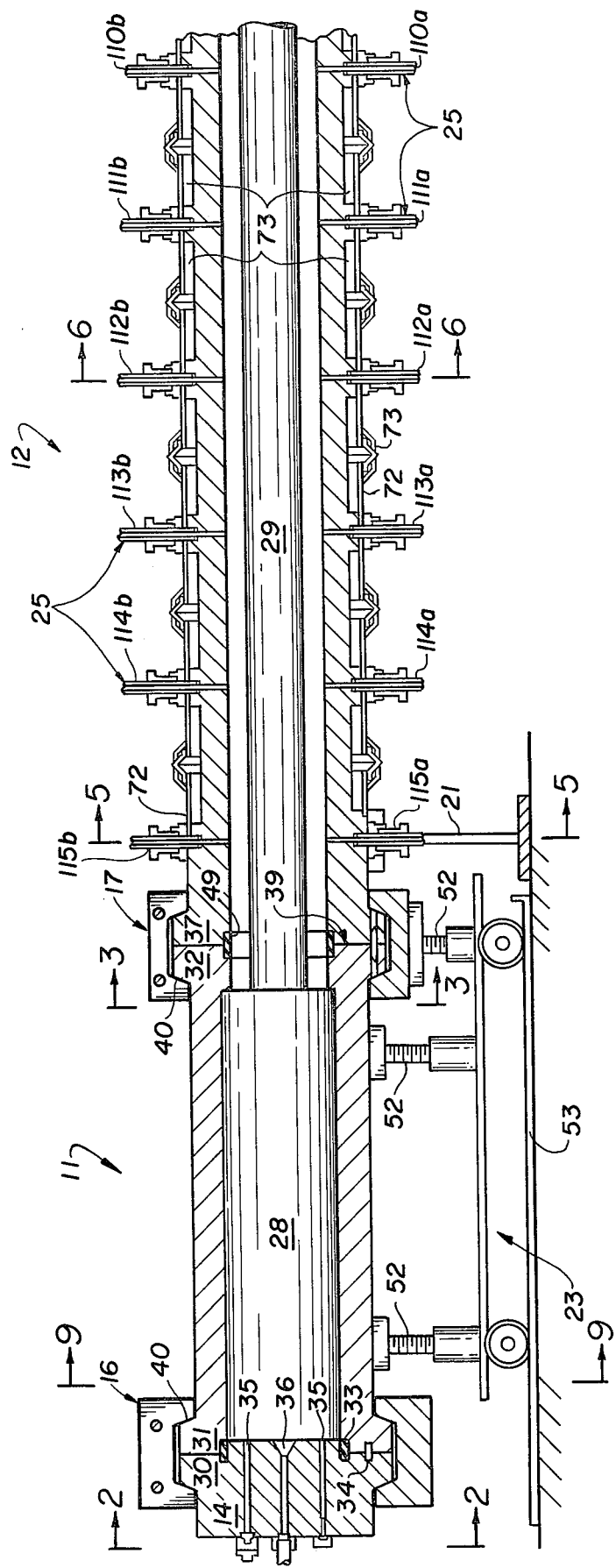
FIG. 1A is a longitudinal section through the stirrer motor housing and a portion of the first reactor body section of the reactor, viewed in the direction of 1A—1A in FIG. 1.
Figure 1B:
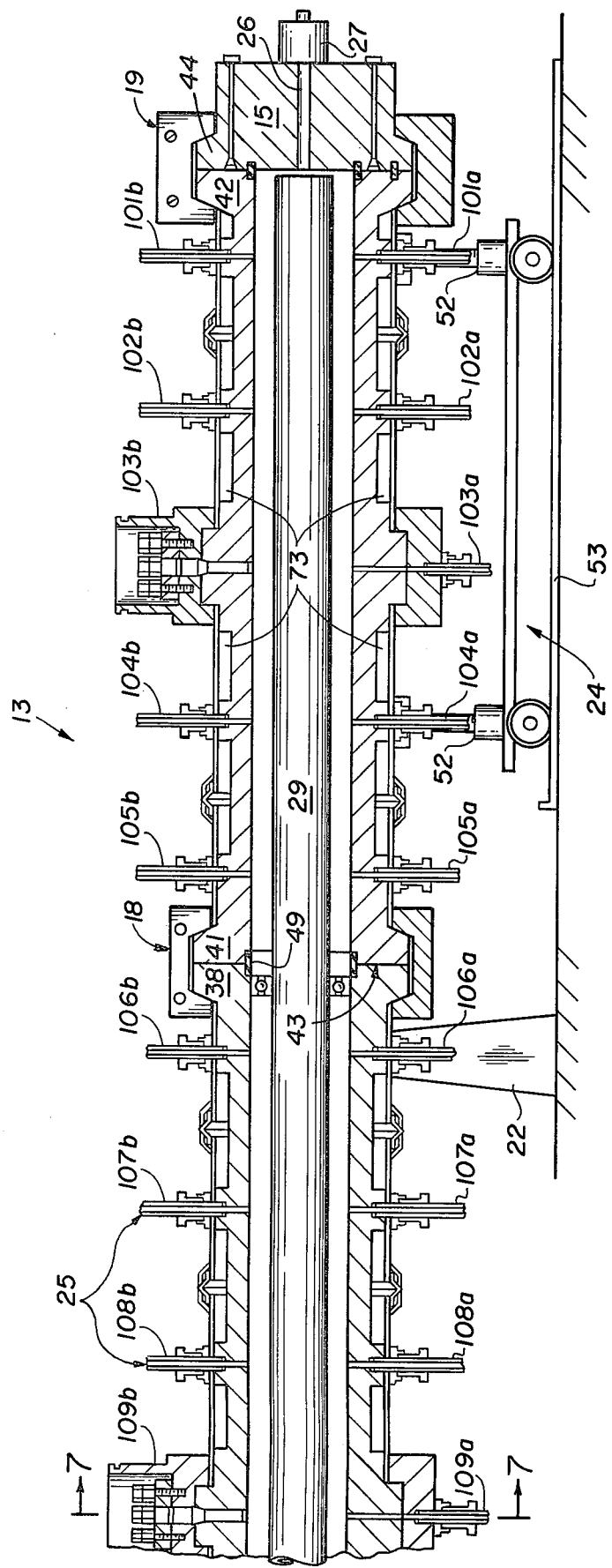
FIG. 1B is a similar longitudinal section through the remaining section of the first reactor body section and through the second reactor body section, viewed in the direction of 1B—1B in FIG. 1.

Referring initially to FIGS. 1, 1A and 1B of the drawings, the preferred embodiment of the ethylene polymerization reactor of the invention comprises an elongated assembly of a stirrer motor housing designated generally at 11, a first reactor body section designated generally at 12, and a second reactor body section designated generally at 13. Three piece closure straps secures end heads 14 and 15 to opposite ends of the assembly, and removably and hermetically secures the respective sections of the reactor to one another. In particular, the closure straps comprises a strap 16 securing end head 14 to the stirrer motor housing 11, a strap 17 securing the stirrer motor housing to the first reactor body section 12, a strap 18 securing the first reactor body section 12 to the second reactor body section 13, and a strap 19 securing the latter section to end head 15.

The reactor assembly is horizontally disposed, supported by a fixed cradle means defined by flexible plate 21 and rigid support 22, and movable cradle means defined by rolling cradles 23 and 24, of which the former is shown in section in FIG. 9. The fixed cradle means (supports 21 and 22) defines a static mount for the first reactor body section 12, save only for accommodating the thermal expansion thereof. The movable cradle means, on the other hand, supports the stirrer motor housing 11 (on rolling cradle 23) and the second reactor body section 13 (on rolling cradle 24) for movement relative to section 12 upon disengagement of the closure straps, to permit disassembly and maintenance of the reactor. The principal section of the elongated reactor vessel, the first body section 12, is thus fixed, the remaining portions of the reactor being movable relative thereto for utmost simplicity and economy of periodic maintenance and repair.

A plurality of side entries, designated generally at 25, are spaced along the length of the first and second reactor body sections 12 and 13. As specifically described hereinafter, monomer, modifier, catalyst or other fluid streams are introduced, emergency venting of runaway reactions is accomplished, and reactor temperatures, pressures and other reaction parameters are measured, through the various side entries for process control purposes. Product outlet conduit 26 is additionally provided in end head 15 for the removal of the high pressure, polymer-containing fluid stream from the reactor. As schematically illustrated in the drawings, pressure let-down valve 27 is provided in the outlet line, integral with the reactor, for decreasing the pressure of the product stream to facilitate separation and recovery of polyethylene therefrom.

Turning now to the specific elements of the reactor assembly, a variable speed motor 28 mounted within the stirrer motor housing 11 drives an elongated stirrer 29 which extends longitudinally from the motor housing substantially throughout the length of the first and second reactor body sections 12 and 13, respectively. The stirrer may be provided with any suitable bearing structure, as well as conventional seals or the like. The stirrer may suitably comprise a drum-type agitator such as described, for example, in Platz et al U.S. Pat. No. 3,708,410 granted January 2, 1973, and Platz et al U.S. Pat. No. 3,759,811 granted Sept. 18, 1973, each of which is assigned to National Distillers & Chemical Corporation. The drum stirrers hereinabove are each known to have a lower initial cost, longer service life, lower power requirements and no critical speed problems. Basically, the drum stirrer comprises a hollow tube in which the reaction volume is that between its outer circumference and the inner reactor well, and the volume within the tube.

The motor housing 11 is provided with flanges 31 and 32 on its opposite ends, the former abutting a flange 30 formed on the reactor end head 14. Seal 33 and alignment pin 34 are also provided between the end head and flange 31. Port 35, three in number, is defined in the end head for power leads to the stirrer motor 28. Monomer, either alone or in admixture, modifier, and/or other reagents are introduced through port 36 and flow through channels provided about the motor 28 and through the motor bearings to cool the motor and lubricate the bearings (not shown in the drawings) and before passing into the reactor.

The first reactor body section 12 has flanges 37 and 38 on each of its ends, flange 37 adjacent the motor housing abutting flange 32 thereon and defining a first joint 39 therewith. Similarly, the second reactor body section 13 has flanges 41 and 42 formed on its opposite ends, flange 41 abutting adjacent flange 38 on the first reactor body section and defining a second joint 43 therewith. Flange 42 on the opposite end of section 13 abuts a mating flange 44 formed on end head 15.

The abutting flanges 30, 31; 32, 37; 38, 41; and 42, 44 are held in secured, hermetically sealed relation by the three piece closure straps 16, 17, 18 and 19, respectively. The structure of the individual closure straps is generally exemplified by that of strap 17, shown in detail in FIGS. 3 and 4. As illustrated therein, strap 17 comprises individual closure straps 45, 46 and 47 having generally U-shaped cross-sections with inner beveled surfaces bearing against corresponding beveled outer surfaces or clamping shoulders 40 of the mating flanges 32 and 37. The closure strap sections are suitably bolted, as at 48, about the mating flanges. A sealing means 49 may also be provided at the respective joints to insure hermetic seals thereat.

Figure 4:
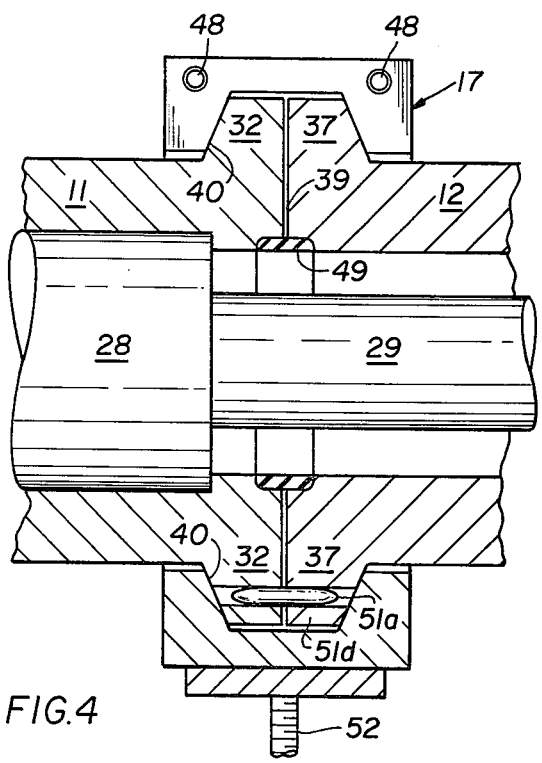
FIG. 4 is a vertical section through the closure straps, viewed in the direction of 4—4 in FIG. 3.

Joints 39 and 43 between the movable portions of the reactor assembly (motor housing 11 and the second reactor body section 13) and the fixed portion of the reactor assembly (the first reactor body section 12) are subject to greater stresses at the high pressure seals 49 than the joints defined between the respective end heads 14 and 15 and the adjoining sections of the reactor assembly. In order to compensate for such stresses a plurality of alignment and stiffening pins 51 $a$, $b$ and $c$ are mounted across each such joint to decrease the alignment and stiffening stresses formed thereat. As depicted in FIGS. 3 and 4 in connection with the first joint 39, the pins 51$a$, $b$ and $c$ extend longitudinally through the abutting flanges 32 and 37 toward the beveled straping shoulders thereof. Desirably, the pins taper inwardly at 51$d$, adjacent their ends, firmly seated in the abutting flanges.

The plurality of alignment and stiffening pins are arranged radially of each of joints 39 and 43; in the preferred embodiment shown the three such pins 51$a$ $b$ and $c$ are disposed at 120° intervals from one another so located as to center on the arc described by elements 45, 46 and 47 of strap 17. A further plurality of alignment and stiffening pins similarly extend through and are radially disposed about the second joint 43.

As indicated hereinabove, the reactor assembly is supported by fixed and movable cradle means, the former of which supports the first and principal reactor body section 12 and the latter of which supports motor housing 11 and the second reactor body section 13 which are movable relative to body section 12 to permit disassembly and maintenance of the reactor. The fixed cradle means comprises flexible support 21, suitably an I-beam support plate capable of deflecting longitudinally of the reactor assembly to accommodate the thermal expansion thereof, and fixed support 22, suitably a rigid concrete cradle. The movable cradle means comprises rolling cradles 23 and 24 which support motor housing 11 and the second reactor body section 13, respectively. These cradles incorporate adjustable supports 52, which may comprise hydraulically or pneumatically actuated jacks, and ride on tracks 53 extending lengthwise of the reactor assembly. Manipulation of the three piece closure straps 16, 17, 18 and 19 and reactor heads 14 and 15 during maintenance operations will be accomplished with suitable auxiliary equipment designed for that specific function.

Figure 6:
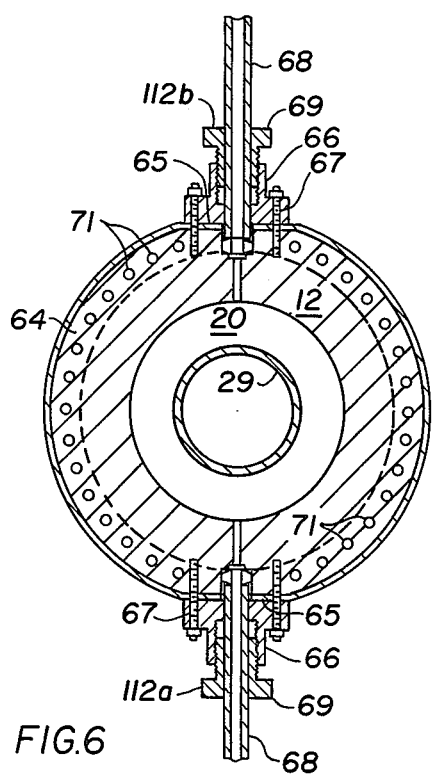
FIG. 6 is a vertical section through a typical pair of reactor side entries, viewed in the direction of 6—6 in FIG. 1A.
Figure 5:
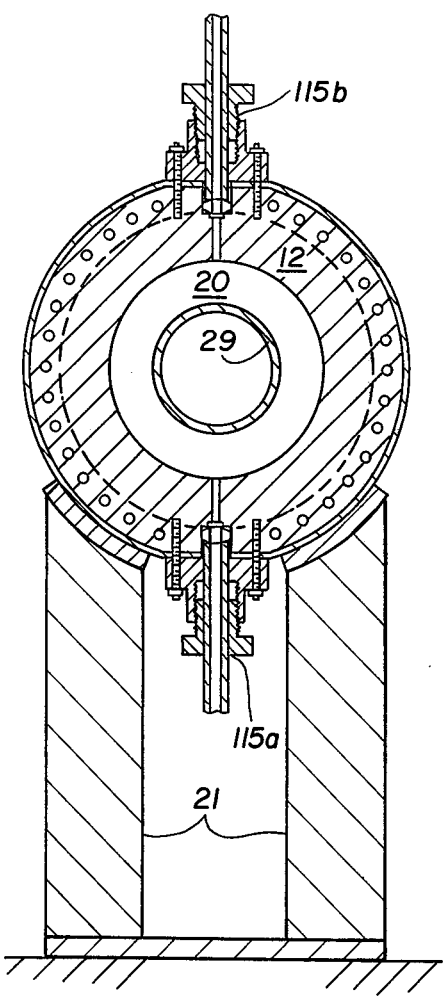
FIG. 5 is a vertical section through the deflection plate forming a portion of the fixed support for the reactor assembly, viewed in the direction of 5—5 in FIG. 1A.

Spaced substantially uniformly along the upper and lower surfaces of reactor body sections 12 and 13 are the previously mentioned reactor side entries, designated generally at 25. As illustrated in connection with a typical side entry in FIG. 6 of the drawings, the entries are mounted to side entry bands 64. These bands are machined onto the reactor body with diametrically opposed flats 65 formed circumferentially thereof for receiving side entry adaptors 66 bolted at 67 thereto. A side entry tube 68 secured by a suitable gland and collar assembly 69 extends through each side entry adaptor 66 into the reactor body. The flatted side entry bands 64 markedly simplify the mounting and integrity of the side entries on the reactor while reducing the reactor fabrication costs.

A plurality of apertures 71 are formed in the side walls of each side entry band 64, facing longitudinally of the reactor. Jacketing 72 is provided circumferentially of the reactor between each such pair of side entry bands to form a steam jacket extending longitudinally of the reactor, the apertures 71 in the side entry bands facilitating the flow of steam through the sequential sections of the steam jacket 73 thus defined.

In lieu of providing reactor jacketing 73 integral with the successive side entry bands 64 formed peripherally of the reactor assembly, the steam jacketing may comprise external plate coil sections such as shown at 74 in FIG. 8. When external plate coil sections are so utilized, each may simply be bolted, as at 75, on the reactor shell between the successive side entry bands. This jacketing technique reduces the reactor fabrication costs.

The side entries may be utilized for the injection of vapor or liquid streams, e.g., ethylene alone or in admixture with other monomers and/or modifiers, or catalyst streams, for the emergency venting of reactants. Thermocouple probes for temperature measurement extend through the side entries spaced longitudinally along the lower surface of the reactor, whereas inlet or outlet streams are connected to the side entries disposed along the upper surface of the reactor. In this manner, in the event of fire, damage to the sensitive thermocouple probes is minimized.

In the preferred reactor embodiment illustrated in FIGS. 1, 1A and 1B, the side entries are suitably connected as follows: side entries 101A-115A comprise thermocouple entries; side entries 103B and 109B are connected to separate rupture discs and thence to separate vertical vent stacks; side entry 104B to a pressure monitoring system, e.g., a strain gauge; and side entries 111B-113B and 115B to monomer, modifier and/or catalyst fluid inlet streams. In such embodiment side entries 101B, 102B and 104B-108B are temporarily plugged but are available for future use. The emergency vent systems are located at 103B and 109B so that they are directly over the locations at which thermal decompositions at the ethylene originate, thus avoiding the possible over-pressuring of the reactor. It will, of course, be understood that, depending upon the parameters of the specific polymerization system and/or the properties of the polymer product or products desired, any number of side entries, connected in whatever manner may be preferred, may be employed in the reactor assembly of the present invention.

FIG. 7 illustrates the configuration of side entry 109$b$ (and, similarly side entry 103B) in greater detail. As illustrated therein, a side entry adaptor assembly 76 having a rupture disc 77 located flush with the inner reactor wall communicates through clamp 78 with a vent stack 79. The vent stack, which extends vertically above the reactor, may be supported by appropriate bracing (not shown) to but a modest height (e.g., 10 to 15 feet) above the reactor assembly. While not specifically so illustrated, it will further be understood that side entries 109$b$ and 103$b$ (and the aligned thermocouple side entries 109$a$ and 103$a$) may be secured to the reactor at a flatted side entry band 64 in the manner discussed hereinabove.

In operation, reactants and the like are introduced into the reactor through port 36 and with catalysts at selected side entries, and are reacted within reaction zone 20 while under constant agitation produced by drum stirrer 29. The polymerization proceeds throughout the length of reaction volume 20, the reaction temperature profile being maintained by the control of the rate of the exothermic polymerization reaction. The polymer product and the residual reactants are removed through outlet line 26 and let-down valve 27 formed integrally with the reactor head 15. The straps 16, 17, 18 and 19 hermetically seal the respective elements of the reactor assembly, insuring safe, continuous operation. During operation the individual sections of the reactor, viz., the motor housing 11 and the first and second reactor body sections 12 and 13, are statically mounted, save only for any thermal expansion permitted by the flexible support 21.

One horizontally disposed, composite ethylene polymerization reactor constructed in accordance with the present invention may incorporate a cylindrical reaction zone having an L/D of about 20, and a total reaction volume of about 70 cubic feet. Ethylene gas may be circulated through such reactor at a rate in excess of 150,000 pounds per hour while maintaining the reaction mixture at average temperatures in excess of 400° F and under pressures greater than 20,000 psi. It shall be understood that the reactor system described has the ability to produce polyethylenes of any desired molecular weight distribution and density by the selective combination of specific reactants, the control of the reaction pressure and the control of the reaction temperature throughout the length of the reactor. The system described has the ability to operate at a uniform reaction temperature or wherein a reaction temperature differential of over 350° F is maintained over the length of the reactor, or any reaction temperature differential in between.

It will be understood that reactors having even greater L/D ratios and total reaction zone volumes, which may be employed at correspondingly greater throughputs, may also be provided in accordance with the present invention. It is, of course, possible to increase the dimensions of the reactor components in order to provide these desiderata; such approach is, however, subject to markedly increased investment costs and inherently limited by material properties and the current state of forging and machining technologies. On the other hand, in accordance with the present invention, it is quite feasible to obtain the desired increased production capacities, without undue additional investment or maintenance costs, and without increased explosion or fire hazards, merely by adding one or more additional movable reactor sections to the horizontal, composite reactor assembly and providing for the ready disassembly of the composite structure thus provided, as more fully described hereinabove. Accordingly, it is intended that the preceding description of one preferred embodiment of the ethylene polymerization reactor of this invention is illustrative only, and should not be construed in a limiting sense.

What is claimed is:

1. An apparatus for the polymerization of ethylene under high pressure, which comprises:
   a. an elongated reactor vessel incorporating
      i. a motor housing,
      ii. a first reactor body section contiguous to and in communication with the motor housing,
      iii. a second reactor body section communicating with the first reactor body section,
      iv. a stirrer extending longitudinally from the motor housing through the first and second reactor body sections,
      v. end heads for sealing the opposite ends of the motor housing and the second reactor body section, respectively, and
      vi. closure straps removably and hermetically securing the motor housing and the respective reactor body sections in assembled relation with the end heads in sealing relation thereon;
   b. means horizontally supporting the reactor, including fixed cradle means and movable cradle means,
      i. the fixed cradle means including means for deflecting longitudinally of the reactor to accommodate the thermal expansion thereof, and,
      ii. the movable cradle means facilitating movement of the motor housing and the reactor body sections relative to one another upon disengagement of the closure straps to permit disassembly and maintenance of the reaction;
   c. a plurality of fluid conduit means disposed lengthwise of the first and second reactor body sections to permit the introduction and withdrawal of fluid streams therethrough, said means being secured to a plurality of side entry means spaced longitudinally of the reactor,
      i. each of said side entry means having securing means disposed circumferentially thereof for mounting the fluid conduit means to the reactor and having a plurality of apertures extending therethrough, and
      ii. adjacent pairs of the apertured side entry means defining reactor jacket sections for the passage of heat transfer fluids therethrough;
   d. a product outlet conduit formed at the end of the end head on the reactor body section; and
   e. pressure reduction means in the product outlet conduit to permit let-down of the pressure of the product stream removed therefrom.

2. The apparatus of claim 1, wherein the fixed cradle means supports the first reactor body section and the rolling cradle means supports the motor housing and the second reactor body section such that the motor housing and the second reactor body section are longitudinally movable relative to the first reactor body section.

3. The apparatus of claim 1, in which the adjacent ends of the motor housing and the first reactor body section are flanged, the flanges abutting one another and defining a first joint; the adjacent ends of the first and second reactor body sections are flanged, the flanges abutting one another and defining a second joint; and said closure straps comprises a plurality of alignment and stiffening members which individually extend longitudinally through the abutting flanges and the plurality of which are radially arranged about each of said joints to decrease the alignment and stiffening stresses formed therein, and straps securing the flanges and stiffening and alignment members in assembled relation at each said joint.

4. The apparatus of claim 1, wherein the fluid conduit means are provided with means for measuring the reaction parameters thereat, and wherein the said fluid conduit means include temperature measurement means spaced longitudinally of and along the lower side of the reactor.

5. A stirred autoclave-type reactor for the polymerization of ethylene under pressures of from 10,000 to 45,000 psi to form low density polyethylene resins, said reactor defining a reaction zone having a volume in excess of 40 cubic feet and an L/D ratio greater than 20 and comprising:
   a. an elongated reactor vessel incorporating
      i. a motor housing having a flange member on at least one end thereof,
      ii. a first reactor body section contiguous to and in communication with the motor housing, said section having a flange element on each of its ends, the flange element adjacent the motor housing abutting the flange member thereon and defining a first joint therewith;

iii. a second reactor body section contiguous to and in communication with the first reactor body section, the second reactor body section having a flange on at least the end adjacent the first reactor body section, said flange abutting the adjacent flange element on the first reactor body section and defining a second joint therewith, iv. a stirrer extending longitudinally from the motor housing substantially throughout the length of the first and second reactor body sections, v. end heads for sealing the opposite ends of the motor housing and the second reactor body section, respectively, and iv. closure straps removably and hermetically securing the motor housing and the respective reactor body sections in assembled relation with the end heads sealing the opposite ends thereof, the closure straps comprising
  i. a plurality of alignment and stiffening pins which individually extend longitudinally through the abutting flanges and the plurality of which are radially arranged about said joints to decrease the alignment and stiffening stresses formed therein, and
  ii. straps securing the abutting flanges and stiffening and alignment pins in assembled relation at each said joint;

b. means horizontally supporting the reactor, including fixed cradle means and rolling cradle means
  i. the fixed cradle means supporting the first reactor body section and including means for deflecting longitudinally of the reactor to accommodate the thermal expansion thereof, and
  ii. the rolling cradle means supporting the motor housing and the second reactor body section, respectively, for separate motion relative to the first reactor body section, upon disengagement of the clamping means, to permit disassembly and maintenance of the reactor;

c. a plurality of side entries disposed lengthwise of the first and second reactor body sections to permit the introduction and withdrawal of fluid streams therethrough and the measurement of reaction parameters thereat, the side entries being secured to side entry bands spaced longitudinally of the reactor,
  i. the individual side entry bands having flats formed circumferentially thereof for mounting the respective side entries to the reactor and having a plurality of longitudinally disposed apertures extending therethrough, and
  ii. adjacent pairs of the apertured side entry bands defining reactor jacket sections for the passage of heat transfer fluids therethrough;

d. a product outlet conduit formed in the end head on the second reactor body section; and e. pressure reduction valve means in the product outlet conduit and integral with the reactor to permit let-down of the pressure of the product stream removed therefrom.

* * * * *